United States Patent [19]

Jeon et al.

[11] Patent Number: 5,822,012
[45] Date of Patent: Oct. 13, 1998

[54] HOME AUTOMATION APPARATUS USING A DIGITAL TELEVISION RECEIVER

[75] Inventors: Byeung-woo Jeon, Sungnam; Sung-tae Kim, Suwon, both of Rep. of Korea

[73] Assignee: Samsung Electronics Co., Ltd., Kyungki-Do, Rep. of Korea

[21] Appl. No.: 704,100

[22] Filed: Aug. 28, 1996

[30] Foreign Application Priority Data

Aug. 28, 1995 [KR] Rep. of Korea ............... 95-26882

[51] Int. Cl.⁶ .................................................. H01N 5/44
[52] U.S. Cl. ...................... 348/553; 348/552; 348/61; 348/152; 340/310.06
[58] Field of Search ........................ 348/553, 152, 348/706, 180, 552, 82, 125, 61; 340/310.06, 310.01, 517, 825.06

[56] References Cited

U.S. PATENT DOCUMENTS

| 4,989,081 | 1/1991 | Miyagawa . | |
| 5,619,251 | 4/1997 | Kuroiwa | 348/12 |

FOREIGN PATENT DOCUMENTS

| 2 902 347 | 8/1982 | United Kingdom | H03J 9/00 |
| 2 162 978 | 2/1986 | United Kingdom | H03J 9/06 |
| 2 204 755 | 11/1988 | United Kingdom | H04B 1/20 |
| 2 285 158 | 6/1995 | United Kingdom | G08C 19/00 |

*Primary Examiner*—Sherrie Hsia
*Attorney, Agent, or Firm*—Sughrue, Mion, Zinn Macpeak & Seas, PLLC

[57] ABSTRACT

A home automation apparatus using a digital television receiver for use in a building is provided. In particular, the apparatus contains a signal processor, a memory unit, a microprocessing unit, a display unit, a sensor input unit, an interface unit, and a controller. The signal processor inputs a television signal and processes the television signal to produce a processed signal. The memory unit stores the television signal and the processed signal based on control signals from the microprocessing unit, and the display unit displays the processed signal as an image. In addition, the sensor input unit is connected to a first sensor, detects a first status of the first sensor, and outputs first sensing data which relates to the first status. Furthermore, the first status relates to a first state of the building, and the first sensing data is output to the microprocessing unit. The interface unit receives an external signal from an external device and the processed signal from the signal processor and selectively outputs the external signal and/or the processed signal to the display unit. The controller is connected to a first appliance of the building, inputs a first command from the microprocessing unit, and outputs a first appliance control signal for controlling the first appliance in accordance with the first command.

20 Claims, 1 Drawing Sheet

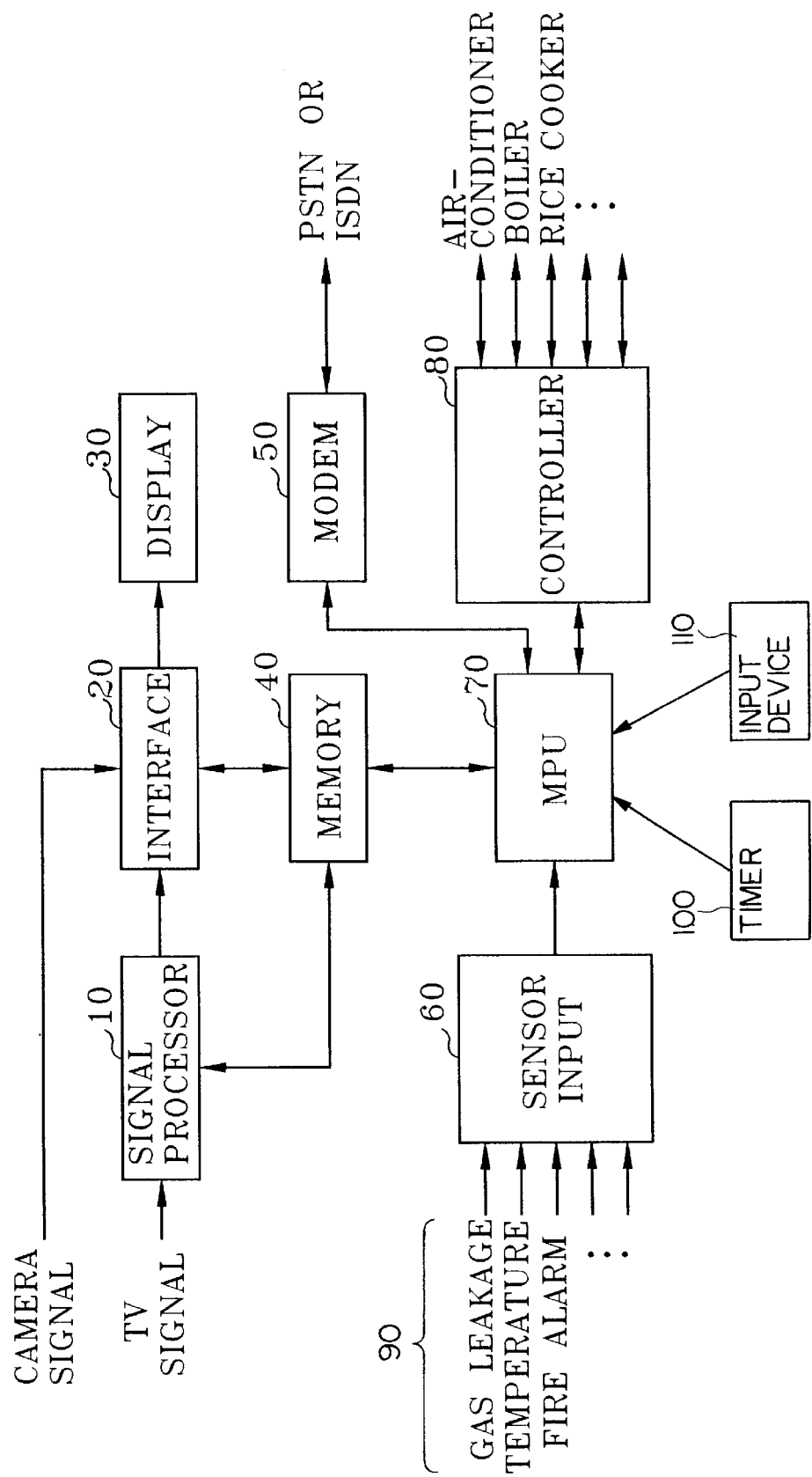

HOME AUTOMATION APPARATUS USING A DIGITAL TELEVISION RECEIVER

RELATED APPLICATION

The present application is based on Korean Application No. 26882/1995 which is incorporated herein by reference for all purposes.

FIELD OF THE INVENTION

The present invention relates to a home automation apparatus. More particularly, the present invention relates to a home automation apparatus which uses a digital television receiver.

BACKGROUND OF THE INVENTION

In general, a digital television ("TV") receiver receives and processes digital signals. Furthermore, since such signals contain a large amount of digital data, the TV receiver comprises a high-performance microprocessing unit ("MPU") and one or more large-capacity memories.

On the other hand, a home automation apparatus monitors the statuses and operations of various devices within a home and informs the user of such statuses and operations. In addition, the apparatus may remotely control various appliances within the home to operate in certain manners.

However, digital TV receivers and home automation apparatuses are separately installed and operate independently of each other. As a result, the MPU, the memories, and the display employed by the receiver are not used by the home automation apparatus, and thus, the apparatus must employ a separate processing unit, memory, and display. Accordingly, the cost of both the TV receiver and home automation apparatus is relatively expensive, and the concurrent operation of such devices is inefficient.

SUMMARY OF THE INVENTION

In order to solve the above problems, one object of the present invention is to provide a home automation apparatus and a digital TV receiver which is relatively inexpensive and operates efficiently.

To achieve the above object of the present invention, a home automation apparatus using a digital television receiver for use in a building is provided. Specifically, the apparatus comprises: a signal processor which inputs a television signal and processes said television signal to produce a processed signal; a memory unit which stores at least one of said television signal and said processed signal; a microprocessing unit which controls when said memory unit stores said at least one of said television signal and said processed signal; a display unit which displays said processed signal as an image; a sensor input unit which is operably connected to a first sensor, detects a first status of said first sensor, and outputs first sensing data which relates to said first status, wherein said first status relates to a first state of said building and wherein said first sensing data is output to said microprocessing unit; an interface unit which receives an external signal from an external device and said processed signal from said signal processor, wherein said interface unit selectively outputs at least one of said external signal and said processed signal to said display unit; and a controller which is connected to a first appliance of said building, inputs a first command from said microprocessing unit, and outputs a first appliance control signal for controlling said first appliance in accordance with said first command.

BRIEF DESCRIPTION OF THE DRAWINGS

The above objects and advantages of the present invention will become more apparent by describing in detail a preferred embodiment thereof with reference to the attached drawing in which:

FIG. 1 is a diagram of a home automation apparatus which uses a digital TV receiver in accordance with one embodiment of the present invention.

DETAILED DESCRIPTION OF THE PREFERRED EMBODIMENT

The following description of the preferred embodiments discloses specific configurations and components. However, the preferred embodiments are merely examples of the present invention, and thus, the specific features described below are merely used to more easily describe such embodiments and to provide an overall understanding of the present invention. Accordingly, one skilled in the art will readily recognize that the present invention is not limited to the specific embodiments described below. Furthermore, the descriptions of various features and structures of the present invention which would be known to one skilled in the art are omitted for the sake of clarity and brevity.

FIG. 1 shows an example of one embodiment of a home automation apparatus in accordance with the present invention. In particular, the apparatus comprises a signal processor 10, an interface 20, a display 30, a memory 40, a modem 50, a sensor input unit 60, a microprocessing unit ("MPU") 70, and a controller 80.

The signal processor 10 inputs a television ("TV") signal, processes the TV signal, and outputs a corresponding processed signal. For example, the processor may input a digital TV signal, decode the digital signal into a decoded signal, and output the decoded signal. Subsequently, the processed signal may be output via the interface 20 to the display 30 and displayed as an image. The memory 40 may also input the TV signal and the processed signal and temporarily store such signals in accordance with controls signals output from the MPU 70.

In addition, the interface 20 may also be connected to an external camera and may output images from the camera so that such images can be selectively displayed on the display 30. For example, a camera may be located near the front door of a user's home, and the user may input a command to instruct the display 30 to display the area near the door in order to determine if anyone is at the front door.

The sensor input unit 60 receives sensing signals from various sensing devices 90 within or around the home and outputs corresponding sensing data to the MPU 70. For instance, the home may contain devices for sensing the temperature, leakage of gas, fire, intruders, etc. within or outside the home. Then, the input unit 60 may periodically, continuously, or selectively monitor the statuses of the sensing devices and output related sensing data to the MPU 70.

The controller 80 receives commands from the MPU 70 and outputs corresponding appliance control signals to various appliances in and around the home. For example, the controller 80 may control the settings and/or operations of an air conditioner, boiler, rice cooker, exterior lights, hot tub, etc. Furthermore, such devices may be controlled in response to information previously stored in the memory 40, in response to commands input by the user in the home from an input device 110, or in response to remote commands supplied from a remote location.

The modem 50 enables the home automation apparatus to transmit information and data to locations outside the home. In particular, the sensing data input via the sensor input unit 60 may be transmitted to a remote location via the modem 60. For example, if the user is at a location away from the home (e.g. at a business office), the modem 50 may dial a predetermined number of the business office to inform the user if a sensor detects a significant problem (e.g. a fire) in the home. Furthermore, the modem 50 could alternatively or additionally dial a predetermined number to inform a local authority (e.g. the fire department) of the problem. Also, the modem 50 may transmit information to a cable television control center to order to select "pay-per-view" programs.

Conversely, the modem 50 enables the home automation apparatus to receive information and data from locations outside the home. For example, the user may send remote commands from a remote site to control the various appliances within the home. Specifically, the user may transmit the remote commands to the modem 50, and the modem 50 may output such commands to the MPU 70. Then, the MPU 70 may output commands to the controller 80 for turning on the air conditioning, heating up the hot tub, or turning on the coffee pot.

An illustrative example of the operation of the home automation apparatus illustrated in FIG. 1 will be described below.

When the user is watching television, the apparatus inputs TV signals via the signal processor 10 and displays an image corresponding the signals on the display 30. In addition, the sensor input unit 60 inputs sensing signals from the various sensors within the home and outputs related sensing data to the MPU 70. Then, the MPU 70 analyzes the data and stores it in the memory 40.

If the MPU 70 determines that the status and operation of a sensor indicates that an abnormal or emergency situation exists within or around the home, the MPU 70 instructs the memory 40 to display relevant information on the display 30. Alternatively, the MPU 70 may cause the information to be displayed in response to a command input by the user. Such information may be displayed on the display 30 in various manners. For example, the information may be displayed within a "picture-in-picture screen" that is overlaid upon a television program or may be displayed in a split screen configuration in conjunction with such program. In addition, the information may completely replace television program and be the only information displayed on the display. Also, the MPU 70 may output transmission commands to the modem 50 to instruct the modem 50 to transmit relevant transmission data to a remote location to inform local authorities of the abnormal or emergency situation.

Furthermore, the user may control the operation of various appliances while he or she is watching television. For example, the user may input commands to the MPU 70 via an input device (e.g. a remote control) (not shown), and the MPU 70 may output such commands to the controller 80 to selectively control one or more appliances. Also, the user may input commands which instruct the appliances to operate in a certain manner at a certain time or at periodic intervals. In this instance, the MPU 70 may store such commands at a particular address in the memory 40. Then, at the certain time or interval, the MPU 70 may read such commands from the memory 40 and output them to the controller 80. In order to keep track of the certain time or interval, the MPU 70 may rely on a timer 100 which is installed in the digital TV receiver.

On the other hand, when the user is at a remote location away from the home, the user may still receive information relating to the statuses and operations of the various sensors. Specifically, the modem 50 may be connected to an integrated services digital network ("ISDN") or a public switch telephone network ("PSTN"), and the MPU 70 may instruct the modem 50 to call a predetermined telephone number corresponding to the user's remote location. Afterwards, the MPU 70 may instruct the modem 50 to transfer transmission data relating to the statuses and operations of the sensors to the remote location. Also, as mentioned above, the transmission data may be sent to a local authority to inform it of an emergency situation.

Similarly, the user can control the various appliances within or around the home by inputting commands to the MPU 70 via the modem 50. For example, the user may input a remote command for immediately controlling the operation of one or more appliances. In such a situation, the modem 50 receives and outputs such command to the MPU 70. Then, the MPU 70 immediately outputs a control signal to the controller 80 to selectively control one or more appliances. Also, if the user inputs a command which instructs the appliances to operate in a certain manner at a certain time or at periodic intervals, the MPU 70 may store the remote command received from the modem 50 at a particular address in the memory 40.

Also, the above embodiment of a home authorization apparatus uses a digital TV receiver. However, other digital receiving devices may be employed by the apparatus. For example, the apparatus may use a satellite broadcasting (DBS) receiver which receives signals via a digital broadcasting system.

As illustrated above, the home automation apparatus of the present invention is capable of performing various functions by using the MPU 70 and the memory unit 40 of a digital TV-receiver. As a result, the apparatus is less expensive and operates more efficiently than a system which uses a digital TV receiver and an independent home authorization apparatus.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed is:

1. A home automation apparatus using a digital television receiver for use in a building, comprising:

a signal processor which inputs a television signal and processes said television signal to produce a processed signal;

a memory unit which stores at least one of said television signal and said processed signal;

a microprocessing unit which controls when said memory unit stores said at least one of said television signal and said processed signal;

a display unit which displays said processed signal as an image;

a sensor input unit which is operably connected to a first sensor, detects a first status of said first sensor, and outputs first sensing data which relates to said first status, wherein said first status relates to a first state of said building and wherein said first sensing data is output to said microprocessing unit;

an interface unit which receives an external signal from an external device and said processed signal from said signal processor, wherein said interface unit selectively outputs at least one of said external signal and said processed signal to said display unit; and a controller which is connected to a first appliance of said building, inputs a first command from said microprocessing unit, and outputs a first appliance control signal for controlling said first appliance in accordance with said first command.

2. The home automation apparatus using a digital television receiver according to claim 1, further comprising:

a modem which receives remote commands and supplies said remote commands to said microprocessing unit and which receives transmission data from said microprocessing unit and outputs said transmission data to a remote location, wherein said remote commands cause said microprocessing unit to output said first command to said controller, and wherein said microprocessing unit outputs said transmission data to said modem in response to said first sensing data.

3. The home automation apparatus using a digital television receiver according to claim 1, wherein said display unit displays said processed signal and said external signal input from said external device in a picture-in-picture format.

4. The home automation apparatus using a digital television receiver according to claim 1, wherein said display unit displays said processed signal and said external signal input from said external device in a double window format.

5. The home automation apparatus using a digital television receiver according to claim 1, wherein said microprocessing unit outputs said first command at a certain time and wherein timing data corresponding to said certain time is stored in said memory unit.

6. The home automation apparatus using a digital television receiver according to claim 5, wherein said microprocessing unit determines if said certain time has arrived by comparing said timing data with an output of an internal timer.

7. A home automation apparatus using a digital television receiver for use in a building, comprising:

a signal processor which inputs a television signal and processes said television signal to produce a processed signal;

a memory unit which stores at least one of said television signal and said processed signal;

a microprocessing unit which controls when said memory unit stores said at least one of said television signal and said processed signal;

a display unit which displays said processed signal as an image; and a sensor input unit which is operably connected to a first sensor, detects a first status of said first sensor, and outputs first sensing data which relates to said first status, wherein said first status relates to a first state of said building and wherein said first sensing data is output to said microprocessing unit.

8. A home automation apparatus using a digital television receiver according to claim 7, wherein said microprocessing unit performs an analysis operation on said first sensing data, wherein said memory unit stores first display sensing data which corresponds to said first sensing data, and wherein said microprocessing unit instructs said memory unit to output said first display sensing data to said display unit.

9. A home automation apparatus using a digital television receiver according to claim 8, wherein said microprocessing unit inputs a first sensor display command via an input device, and wherein said microprocessing unit instructs said memory unit to output said first display sensing data to said display unit when said microprocessing unit receives said first sensor display command.

10. A home automation apparatus using a digital television receiver according to claim 8, wherein said microprocessing unit instructs said memory unit to output said first display sensing data to said display unit when said analysis operation indicates that an abnormal situation concerning said building has occurred.

11. The home automation apparatus using a digital television receiver according to claim 7, further comprising:

a modem which receives transmission data from said microprocessing unit and outputs said transmission data to a remote location, wherein said microprocessing unit performs an analysis operation on said first sensing data, and wherein said microprocessing unit generates said transmission data in accordance with said first sensing data and outputs said transmission data to said modem when said analysis operation indicates that an abnormal situation concerning said building has occurred.

12. The home automation apparatus using a digital television receiver according to claim 11, wherein said remote location relates to a local authority which is capable of responding to said abnormal situation.

13. The home automation apparatus using a digital television receiver according to claim 11, wherein said remote location is a location which is predetermined based on location commands input via an input device.

14. A home automation apparatus using a digital television receiver for use in a building, comprising:

a signal processor which inputs a television signal and processes said television signal to produce a processed signal;

a memory unit which stores at least one of said television signal and said processed signal;

a microprocessing unit which controls when said memory unit stores said at least one of said television signal and said processed signal;

a display unit which displays said processed signal as an image; and a controller which is connected to a first appliance of said building, inputs a first command from said microprocessing unit, and outputs a first appliance control signal for controlling said first appliance in accordance with said first command.

15. The home automation apparatus using a digital television receiver according to claim 14, wherein said microprocessing unit inputs a user command via an input device and outputs said first command based on said user command.

16. The home automation apparatus using a digital television receiver according to claim 14, further comprising:

a modem which receives remote commands from a remote location and outputs said remote commands to said microprocessing unit, and wherein said remote commands cause said microprocessing unit to output said first command to said controller.

17. The home automation apparatus using a digital television receiver according to claim 15, wherein said user command comprises timing data relating to a certain time at which said microprocessing unit is to output said first command, wherein said microprocessing unit stores said timing data in said memory unit, and wherein said microprocessing unit determines if said certain time has arrived by comparing a current time with said timing data and outputs said first command when said current time equals said certain time.

18. The home automation apparatus using a digital television receiver according to claim 16, wherein said remote commands comprise timing data relating to a certain time at which said microprocessing unit is to output said first command, wherein said microprocessing unit stores said timing data in said memory unit, and wherein said microprocessing unit determines if said certain time has arrived by comparing a current time with said timing data and outputs said first command when said current time equals said certain time.

19. The home automation apparatus using a digital television receiver according to claim 7, further comprising:

an interface unit which receives an external signal from an external device and said processed signal from said signal processor, wherein said interface unit selectively outputs at least one of said external signal and said processed signal to said display unit.

20. The home automation apparatus using a digital television receiver according to claim 14, further comprising:

an interface unit which receives an external signal from an external device and said processed signal from said signal processor, wherein said interface unit selectively outputs at least one of said external signal and said processed signal to said display unit.

* * * * *